Nov. 17, 1953 G. L. FOGAL ET AL 2,659,557
PARACHUTE PACK LATCH MECHANISM
Filed Sept. 27, 1951 2 Sheets-Sheet 1

INVENTORS.
G. L. FOGAL
A. M. MITNICK
BY
G. D. O'Brien
R. M. Hicks ATTYS.

Nov. 17, 1953    G. L. FOGAL ET AL    2,659,557
PARACHUTE PACK LATCH MECHANISM
Filed Sept. 27, 1951    2 Sheets-Sheet 2
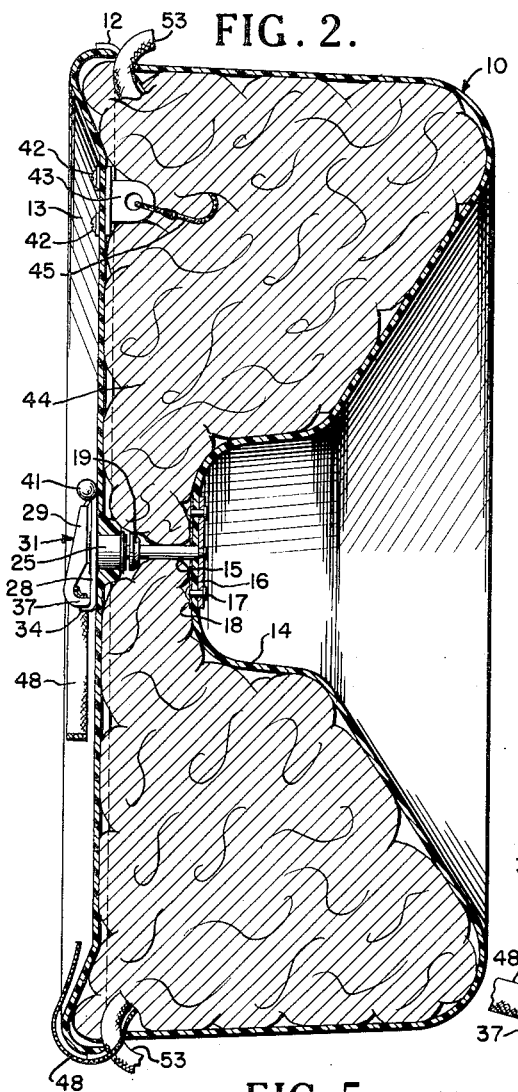
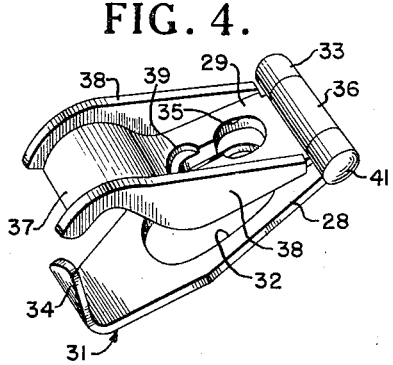
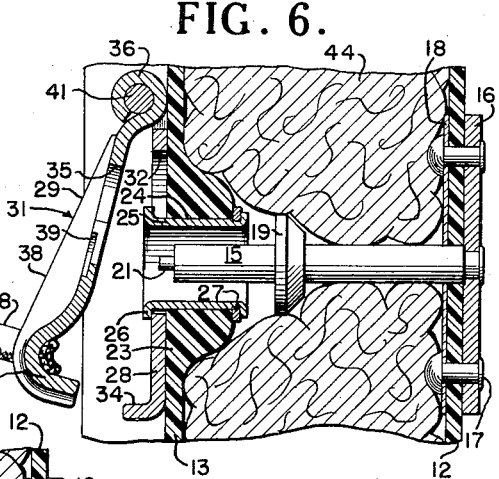
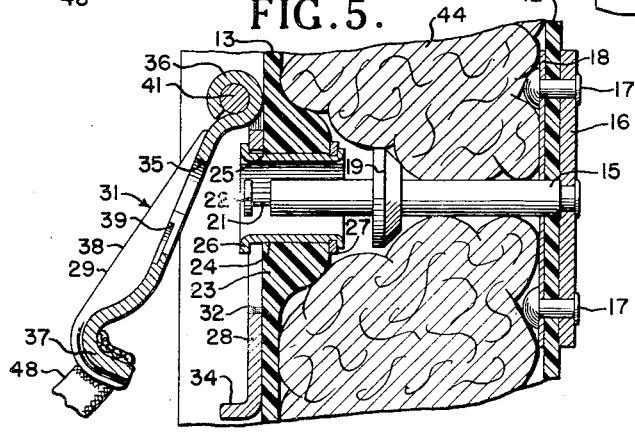
INVENTORS.
G. L. FOGAL
A. M. MITNICK
BY
G. D. O'Brien
R. M. Hicks ATTYS.

Patented Nov. 17, 1953

2,659,557

UNITED STATES PATENT OFFICE 2,659,557

PARACHUTE PACK LATCH MECHANISM

Gordon L. Fogal and Albert M. Mitnick, Silver Spring, Md., assignors to the United States of America as represented by the Secretary of the Navy Application September 27, 1951, Serial No. 248,627

7 Claims. (Cl. 244—148)

(Granted under Title 35, U. S. Code (1952), sec. 266)

The present invention relates to parachute packs for use with aircraft launched mines and more particularly to a parachute pack having an improved latch mechanism for releasably retaining the cover thereof.

The present invention provides improvements over the device disclosed in Patent No. 2,476,969 issued to G. L. Fogal et al. for Parachute Pack. In the device of the present invention the static line of the parachute pack is separated from the metallic retaining latch after the static line moves the latch to release the cover of the pack, the latch being secured to the cover against displacement.

An object of the present invention is to provide a new and improved latching mechanism for the cover of a parachute pack which is detached in a positive manner from the static line of the pack during a launching operation.

Another object is to provide an improved latching mechanism for the cover of a parachute pack which prevents damage to the aircraft during a launching operation.

A further object is to provide a novel cover retaining mechanism for a parachute pack which releases the cover upon being pulled by a static line attached thereto and which thereafter is released from the static line in a positive manner and leaving no metallic parts on the free end thereof.

Other objects and many of the attendant advantages of this invention will be readily appreciated as the same becomes better understood by reference to the following detailed description when considered in connection with the accompanying drawings wherein:

Fig. 2 is a sectional view taken along line 2—2 of Fig. 1;

Fig. 4 is a detail perspective of the latch per se;

Fig. 5 is a view similar to Fig. 3 and showing one way of releasing the cover and static line; and Fig. 6 is a view similar to Fig. 5 and showing another way of release.

Figure 1:
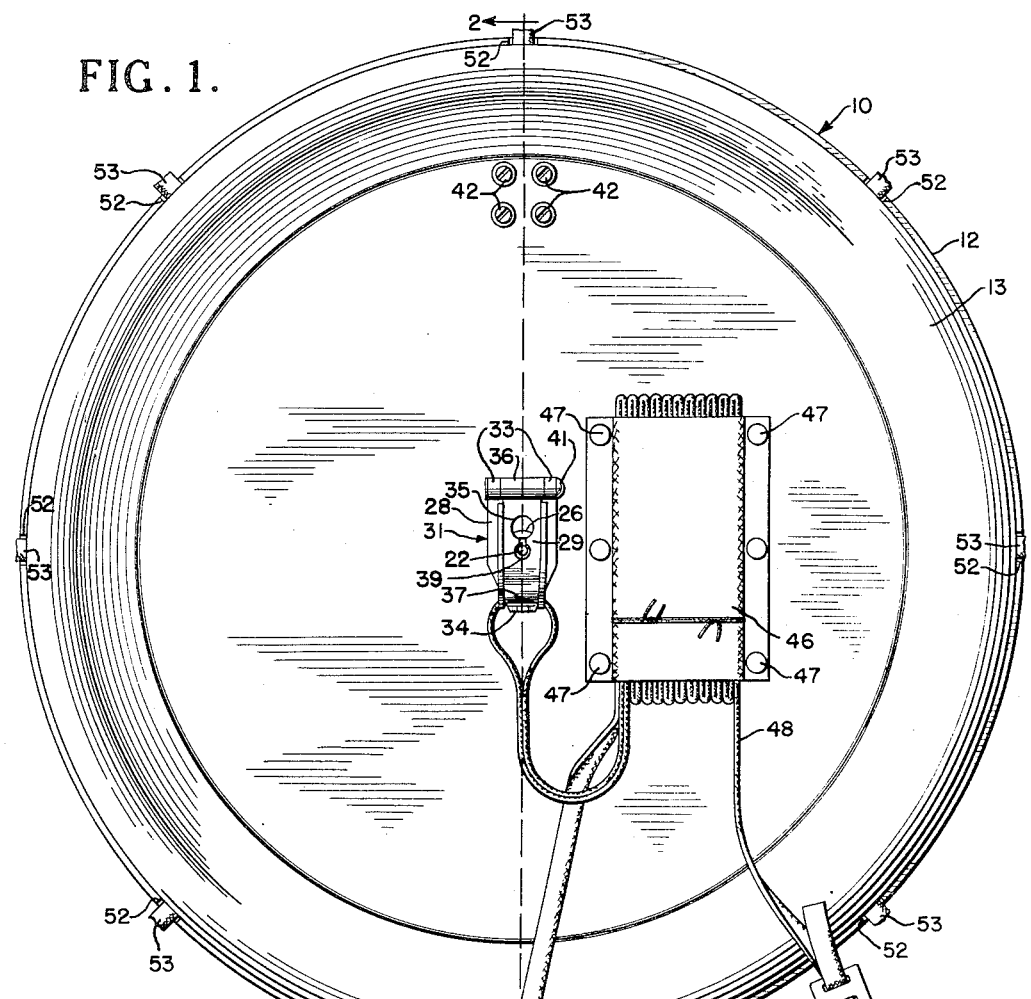
Fig. 1 is a face view of a parachute pack in accordance with the present invention and showing the latch mechanism in a position to secure the cover of the pack.
Figure 3:
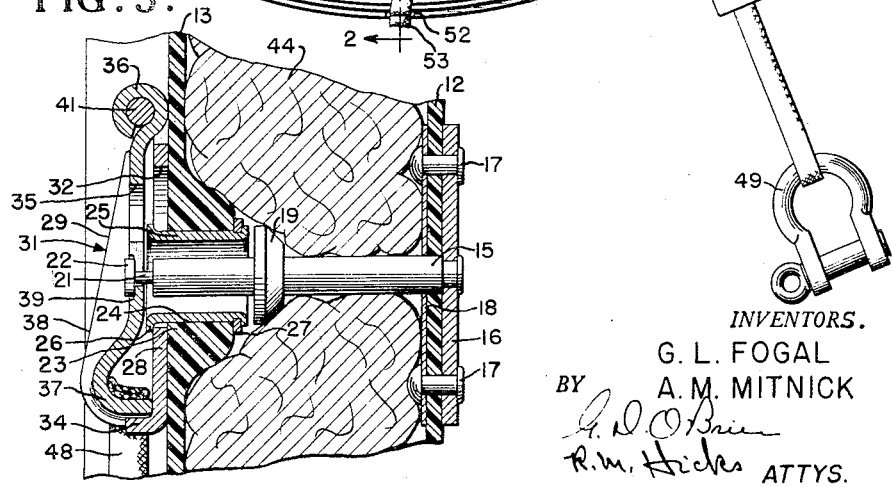
Fig. 3 is an enlarged detail sectional view of the latching mechanism.

Referring more particularly to the drawings wherein like numerals indicate like parts throughout the several views, 10 indicates generally a parachute pack for use with an aerial launched mine (not shown), and having a dish-shaped housing 12 and a cover 13 therefor both being formed of a suitable molded plastic material. The housing 12 is indented as at 14 to fit around the tail portion of a mine (not shown). A pin 15 has secured thereto a disk member 16 and is axially mounted on the outside of the indented portion 14 by rivets 17. In order to strengthen the point of attachment a second disk member 18 is mounted on the inside of the indented portion 14, the rivets 17 also passing through disk 18. Pin 15 is provided at a point approximately midway the length thereof with an enlarged stop portion 19, the purpose of which will be hereinafter more fully described. The pin 15 is also provided at the opposite end with respect to disk 16 with a reduced portion 21 and a head 22.

Cover 13 is provided at the axis thereof with a hub enlargement 23 having a bore 24 therethrough. A flanged tubular member 25 is mounted in bore 24 and is secured therein by flange 26 at the outer end thereof and by spinning the inner end over washer 27. Interposed between flange 26 and the outer surface of cover 13 is the inner one of a pair of hinged members 28 and 29 forming a latch indicated generally at 31. Inner member 28 is provided with an elongated slot 32 to permit limited longitudinal movement of member 28 with respect to tubular member 25. Member 28 has a pair of hinge tubes 33 at one end thereof and an outwardly turned lip or finger 34 at the other end thereof, while member 29 is provided with a keyhole slot 35 adjacent slot 32, a hinge tube 36 at one end and an outwardly and inwardly bent static line receiving finger 37 which nests against the lip 34. Member 29 is also provided with a pair of stiffening flanges along the sides thereof as indicated at 38. Keyhole slot 35 is provided at the restricted end thereof with a slight recess 39 for receiving the head 22 of pin 15. A pin 41 passes through hinge tubes 33 and 36 to hingedly secure members 28 and 29 together.

Secured by screws 42 interiorly of the cover 13 and adjacent one side thereof is an eye member 43. Mounted within the pack 10 is a parachute 44 having one end of a line 45 secured thereto at a convenient point. Line 45 is secured at the other end thereof to the eye 43. A pocket 46 is secured to the cover 13 on the outside thereof by means of rivets 47, a length of static line 48 being folded therein. As indicated in Fig. 1 the static line, at one end thereof, has a fastener 49 fastened thereto by means of an adjustable buckle 51, the other end of the static line 48 also being fastened to the parachute 44 at a convenient point. As further indicated in Fig. 1 the folded static line 48 passes out of the pocket 46 through the finger portion 37 of latch 31, back into the pocket 46 and thence into the pack 10.

The housing 12 is provided at the periphery thereof with notches 52 through which pass the shroud lines 53 of parachute 44, the lines 53 being secured to the mine or other load in any well-known manner (not shown).

In securing the cover 13 to housing 12, the cover 13 is placed within the lip of housing 12, pin 15 extending into flanged tubular member 25 and by springing inwardly the center of cover 13 until the inner end of member 25 contacts stop 19 and the head 22 of pin 15 projects through the enlarged portion of keyhole slot 35 of outer member 29. Latch 31 is moved with respect to the securing tubular member 25 to the other end of elongated slot 32 which aligns the recess 39 at the reduced end of keyhole slot 35 with the head 22 of pin 15. Cover 13 is released to spring outwardly thus nesting head 22 in recess 39 and securing the latch 31 in latching position to secure the cover 13 and the static line 48.

In operation, when the mine or load is released from an aircraft in flight, one end of the static line 48 being fastened to the launching aircraft, a length of the folded portion of the static line is pulled from the pocket 46. A pull is exerted on latch 31 by static line 48 moving the latch to the opposite end of slot 32 by either forcing head 22 out of recess 39 or breaking pin 15 at reduced portion 21.

It is, of course, understood that latch 31 is secured to cover 13 loosely to permit sliding and rotative movement of the latch with respect to the cover. The latch will thus turn in the direction of pull when a pulling force is exerted by the static line.

When the head 22 is broken off or pulls through the enlarged portion of keyhole slot 35, the cover 13 is released. Cover 13 acts as a pilot, withdrawing parachute 44 from housing 12 by means of line 45. There is also provided an extension of static line 48 which passes from latch 31 back to pocket 46 and thence into the pack 10 through one of the notches 52 where it is attached to the parachute 44. The purpose of the foregoing static line extension is to ensure the opening of the parachute in case of failure of line 45. When the cover is released the outer latch member 29 hinges on pin 41, activated by the pull of the static line 48, the finger portion 37 moving away from lip 34 thus releasing the static line 48 from the latch and cover and having no metallic parts on the free end thereof to whip in the slip stream of the aircraft to cause injury to the aircraft.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. Latching apparatus for a parachute pack having a cover and comprising, in combination, a first member having a hinge end and a finger end, said first member having an elongated slot substantially intermediate the ends thereof, a second member having a hinge end and a finger end, said second member having a keyhole slot substantially intermediate the ends thereof and adapted to overlie the elongated slot, means extending through the hinge ends of said first and second members for hingedly joining said members together, a headed pin axially and fixedly mounted in said pack and extending through an axial opening in said cover when said cover is sprung inwardly, and a flanged tubular member extending through said axial opening and said elongated opening for securing said first member to said cover for lateral and rotary motion with respect thereto, said pin extending through the tubular member and said first and second members, said keyhole slot having at the reduced end thereof a recess for receiving the head of said pin to prevent accidental displacement of said latch.

2. A parachute pack for an aircraft launched load comprising, in combination, a dish-shaped housing for said parachute, a cover for said housing, a pin mounted axially and fixedly within said housing, said pin having a stop portion, a reduced portion and a head portion, said cover having an axial bore to receive said reduced and head portions of said pin, said bore being of less diameter than the stop portion to prevent movement of the cover beyond the stop portion, and a latch member for said cover, said latch member including a pair of hingedly connected members, one of said hingedly connected members having an elongated slot, the other of said hingedly connected members having a keyhole slot overlying said elongated slot and adapted to receive the head portion of said pin, said hingedly connected members having finger means for releasably retaining a static line, said static line exerting a pull on said latch as the load is released from the aircraft to release said latch.

3. Latching apparatus for retaining the cover of the housing of a parachute for an aerial launched mine comprising, in combination, headed pin means secured to said housing and extending through the axis thereof, a pair of mutually hinged latch members, each of said latch members having a hinged end and a free end, one of said latch members being secured to said cover for sliding movement with respect thereto and having an outwardly turned finger at the free end thereof, the other of said latch members having a keyhole slot for receiving said pin whereby the latch retains said cover on said housing when the latch is moved to the latching position thereof and having an inwardly turned finger at the free end thereof, one of said fingers overlying the other of said fingers to releasably retain a static line when the latch is in the latching position thereof, said static line being secured to an aerial launching means and exerting a pull on said latch to move said latch to the pin releasing position thereof when said mine is launched, said latch releasing the static line when the latch is moved to the pin releasing position.

4. In a latch apparatus for a covered parachute pack comprising, in combination, a pair of members hinged together and adapted to be in face adjacency when in latching position, a finger portion formed on the free end of each of said hinged members, said finger portions being bent in a direction toward each other and interfitting to releasably secure a static line to said latch, one of said pair of members having an elongated slot formed intermediate the ends thereof, the other one of said pair of members having a keyhole slot formed therein and normally overlying said elongated slot, headed pin means fixed to said pack and mounted interiorly and axially therein, means for fastening said one of said pair of members to the cover of said pack for limited sliding movement, said pin means extending through the elongated slot and the keyhole slot of said pair of members whereby sliding movement of the members in one direction locks the cover and the static line to the pack and movement in the opposite direction unlocks the cover and static line therefrom.

5. Latching apparatus for retaining the cover of the housing of a parachute for an aerial launched mine comprising, in combination, headed means secured to said housing, a flanged tubular member fixed to and extending through said cover, said headed means extending through said tubular member, and a pair of hingedly connected latch members forming a jaw, the inner of said latch members being retained on said tubular member for limited sliding movement with respect thereto, the outer of said latch members having keyhole slot means in releasable locking engagement with said headed means whereby a static line is releasably held in said jaw, said latch members moving with respect to said tubular member and said headed means to release the headed means through the keyhole slot when a pull of sufficient force is exerted on said static line.

6. Latching apparatus for retaining the cover of the housing of a parachute for an aerial launched mine comprising, in combination, weakened headed means secured to said housing, a flanged tubular member fixed to and extending through said cover, said headed means extending through said tubular member, and a pair of hingedly connected latch members forming a jaw, the inner of said latch members being retained on said tubular member, the outer of said latch members having a keyhole slot therein and being releasably retained on said headed means whereby a static line is releasably held in said jaw and the cover is retained on said housing, said weakened headed means breaking to release said outer latch member and said cover when a pull of sufficient force is exerted on said static line.

7. Latching apparatus for retaining the cover of a parachute housing for an aerial launched mine, weakened headed means secured to said housing and extending through said cover, and a pair of hingedly connected latch members forming a jaw for releasably receiving a static line, the inner of said latch members being secured to said cover, the outer of said members having means for receiving said weakened headed means thereby to retain said cover on the housing and to release the cover when a pull of sufficient force is exerted on the static line to break the weakened headed means.

GORDON L. FOGAL.
ALBERT M. MITNICK.

References Cited in the file of this patent

UNITED STATES PATENTS

| Number | Name | Date |
|---|---|---|
| 689,991 | Rubin | Dec. 31, 1901 |
| 2,476,969 | Fogal | July 26, 1949 |

FOREIGN PATENTS

| Number | Country | Date |
|---|---|---|
| 256,735 | Great Britain | Aug. 19, 1926 |